May 28, 1957
J. H. ANDERSON
2,793,513
FLEXIBLE COUPLING
Filed Dec. 5, 1955
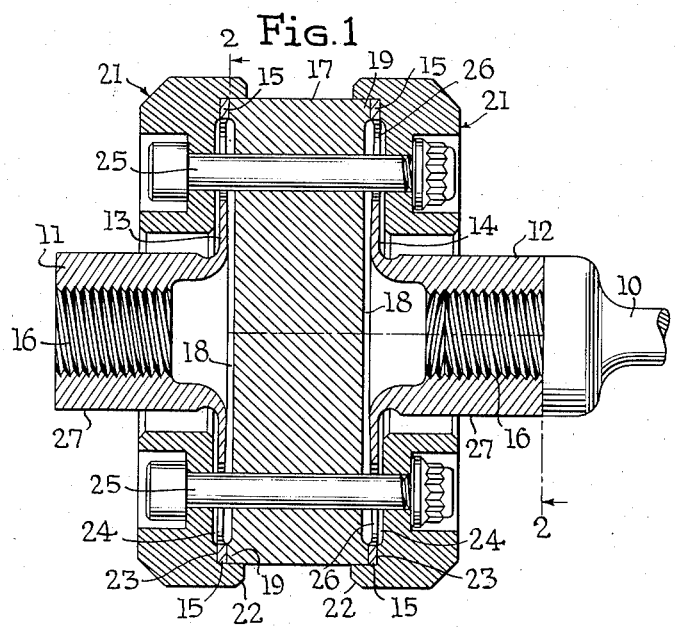
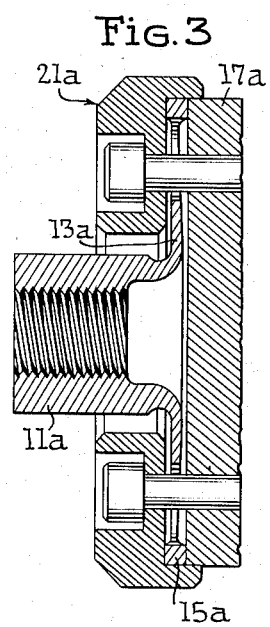
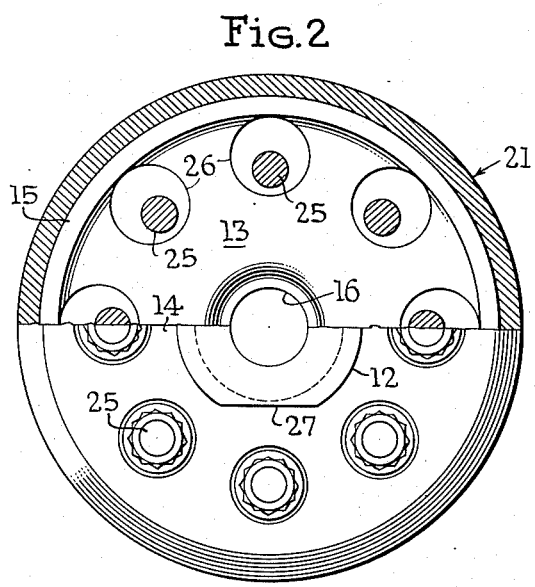
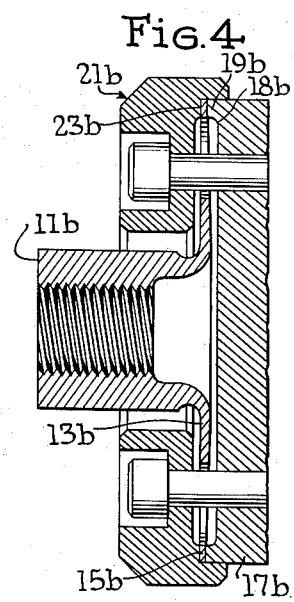
INVENTOR
James H. Anderson
BY *Dodge and Sons*
ATTORNEYS

# United States Patent Office 2,793,513
Patented May 28, 1957

2,793,513

FLEXIBLE COUPLING

James H. Anderson, Spring Garden Township, York County, Pa., assignor, by mesne assignments, to Borg-Warner Corporation, Chicago, Ill., a corporation of Illinois Application December 5, 1955, Serial No. 550,990

Claims priority, applications Canada July 21, 1955; Australia and Great Britain October 7, 1955

6 Claims. (Cl. 64—15)

This invention relates to flexible couplings of the flexible disc type and the novelty resides in details of construction which permit the coupling to be dismounted without dismounting either of the shafts which it connects, and which simplify accurate assembly. A notable departure from constructions used heretofore is that the clamping bolts are not loaded in shear. Instead the entire torque transmitted by the coupling is absorbed by continuous frictional clamping around the peripheries of the flexible discs.

An embodiment of the invention used to drive a centrifugal compressor, and hence suited to high rotary speeds, is illustrated in the accompanying drawing, in which:

Fig. 1 is an axial section through the complete coupling.

Fig. 2 is a view part in section and part in end elevation as indicated by the line 2—2 on Fig. 1.

Fig. 3 is a fragmentary view similar to a portion of Fig. 1, showing a modification.

Fig. 4 is a fragmentary view similar to a portion of Fig. 1, showing another modification.

Refer first to Figs. 1 and 2. Two identical hubs 11 and 12 carry disc-like flexible flanges 13 and 14. These flanges are substantially flat since a conical form would tend to be undesirably rigid. However, the flanges do taper outward (in radial directions) and have a thickened marginal rim 15 which serves to localize the clamping engagement.

The hubs 11 and 12 are bored and threaded as indicated at 16. Precision in the boring and threading operations is important. This mode of connecting a hub to a shaft is unconventional, but is adopted for two reasons.

The first reason is that it permits dismounting of the hubs without dismounting the shafts. The second, and a truly vital consideration is that it permits connection of a slender shaft such as 10, used where very high rotary speeds are involved. Observe that the shaft and its flange and also the threaded shaft end will run in perfect balance.

To facilitate dismounting, a filler-piece 17 is mounted between the flanges 13 and 14 and has a thickness over all at least as great as, and preferably a little greater than the length of threaded engagement. Removal of the filler-piece offers enough clearance to permit each hub to be unscrewed from its shaft.

The periphery of filler-piece 17 matches the peripheries of the flanges 13 and 14 and its faces are relieved (i. e. recessed) at 18, to leave marginal rims 19, one on each face. These mate with and engage the rims 15 on the flanges 13 and 14.

Two clamping rings 21, engage the outer faces of respective flanges 13, 14 and have peripheral flanges 22 which closely surround the peripheries of flanges 13, 14 and portions of the periphery of filler-piece 17. Thus centering is assured.

Each ring has a plane seat 23 for the rim 15, and within this seat is relieved as shown at 24.

The rings 21, 21 are drawn together to clamp the rims 15 each between a rim 19 and a seat 23 while affording ample clearance for flexure of flanges 13 and 14. Clamping pressure can be applied in several ways, but I prefer and show eight bolts 25 which pass through aligned holes in the two rings 21, the flanges 13, 14 and the filler-piece 17. These bolts fit the holes in the parts 21, and 17, but as best indicated at 26 in Fig. 2, the holes in the flanges are much larger than the shanks of the bolts 25.

As a consequence, flexure of the flanges 13 and 14 is not restrained by the bolts. Hence free symmetrical flexure is assured.

The flat 27 shown in Fig. 2 is one of two opposed flats which offer a wrench grip. This is used in screwing the hub on and off its shaft. Other means, not shown, are used to hold the shaft against rotation at such times.

Fig. 3 shows a modified construction in which the filler 17a is formed with plane end faces, and the rings 21a lack the reliefs 24 shown in Fig. 1. The rim 15a on each flexible disc (see 13a) is made wide enough to afford the clearance afforded in Fig. 1 by reliefs 18 and 24.

Fig. 4 shows another modification of the construction in which the reliefs 18b in the filler-piece 17b are deeper than the corresponding reliefs 18 in the construction shown in Fig. 1. The marginal edge 15b is provided with parallel side surfaces clamped between the seat 23b and the rims 19b. This edge 15b is not thickened as it is in the embodiments of Figs. 1 and 3.

It is not strictly necessary that the filler-piece 17, 17a or 17b be a solid disc, for the peripheral annular portion between the two rims 15 or 15a or marginal edge 15b, is the truly indispensable part, assuming adequate clamping action. It is, however, advantageous to have the bolts 25 closely confined and held parallel during assembly, and advantageous to have them fit the bolt holes in rings 21. This is true even though the bolts are loaded only in tension. The invention does not contemplate that they will ever be loaded in shear.

Other variants within the scope of the claims can readily be evolved.

This application is a continuation-in-part of my co-pending application Serial No. 498,921, filed April 4, 1955.

What is claimed is:

1. A flexible coupling for connecting two shafts which are axially aligned, comprising two hubs, each hub having means to fix it on the end of a corresponding shaft, and each having an integral flexible flange substantially normal to the axis of the hub, each flange having a marginal edge; a filler-piece mounted between said edges and conforming substantially to the peripheral contour thereof; annular clamping rings which engage the relatively remote faces of the two edges and have marginal annular flanges which confine the peripheries of respective edges and a portion of the periphery of the filler-piece to hold these parts centered; and means wholly free of contact with said flanges serving to draw said clamping rings together to clamp the peripheral edges of the flanges upon the filler-piece.

2. The combination defined in claim 1 in which the means to fix the hubs or respective shafts are screw threads, and the axial length of engagement of said threads is less than the overall thickness of the filler-piece, whereby withdrawal of the filler-piece offers sufficient clearance for the removal of a hub.

3. The combination defined in claim 1 in which the means serving to draw the clamping rings together are bolts passing through close fitting holes in said rings and the filler-piece and freely through larger holes in the flanges.

4. A flexible coupling for connecting two shafts which are axially aligned, comprising two hubs, each hub having means to fix it on the end of a corresponding shaft, and each having an integral flexible flange substantially normal to the axis of the hub, each flange having a thickened rim; a filler-piece mounted between said rims and conforming substantially to the peripheral contour thereof; annular clamping rings which engage the relatively remote faces of the two rims and have marginal annular flanges which confine the peripheries of respective rims and a portion of the periphery of the filler-piece to hold these parts centered; and means wholly free of contact with said flanges serving to draw said clamping rings together to clamp the peripheral rims of the flanges upon the filler-piece.

5. The combination defined in claim 4 in which the means to fix the hubs on respective shafts are screw threads, and the axial length of engagement of said threads is less than the overall thickness of the filler-piece, whereby withdrawal of the filler-piece offers sufficient clearance for the removal of a hub.

6. The combination defined in claim 4 in which the means serving to draw the clamping rings together are bolts passing through close fitting holes in said rings and the filler-piece and freely through larger holes in the flanges.

No references cited.